Dec. 24, 1968
L. MAJOCH
3,417,431
ADJUSTABLE EXTRUSION DIE
Filed Jan. 30, 1967
2 Sheets-Sheet 1
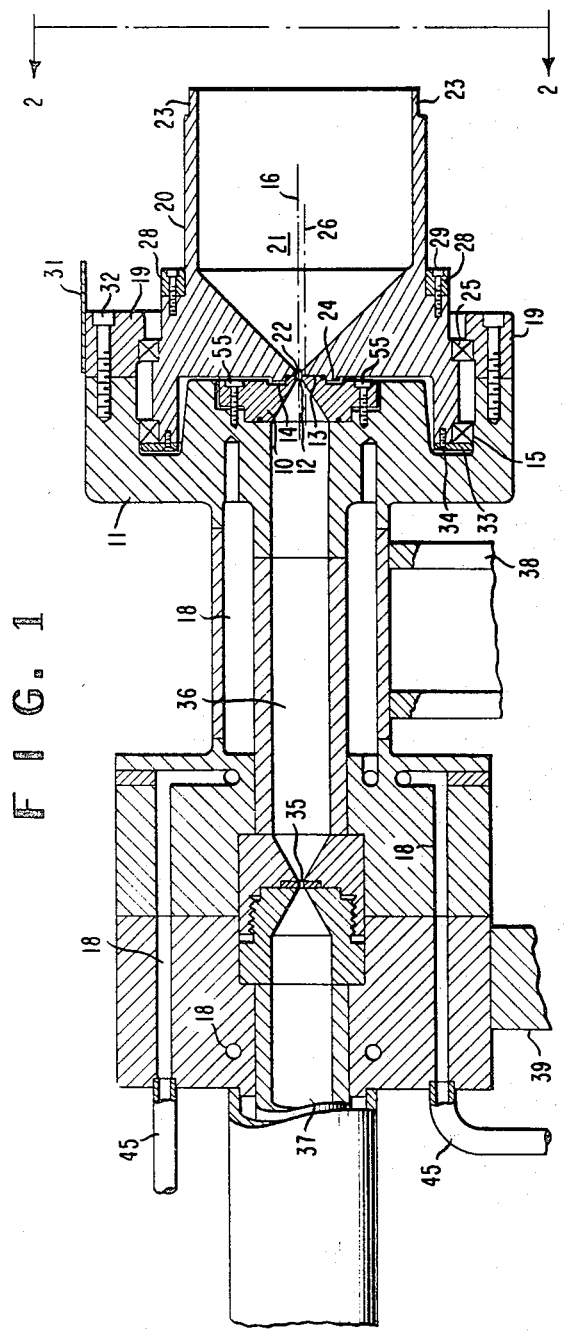
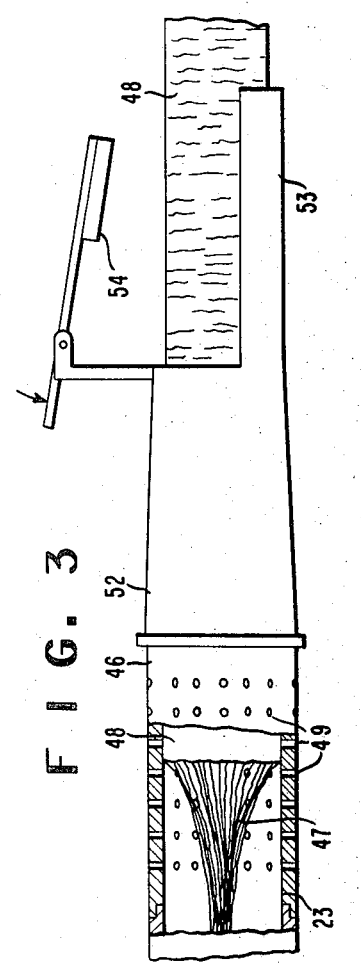
INVENTOR
LUDVIK MAJOCH
BY
ATTORNEY Dec. 24, 1968  L. MAJOCH  3,417,431
ADJUSTABLE EXTRUSION DIE
Filed Jan. 30, 1967  2 Sheets-Sheet 2
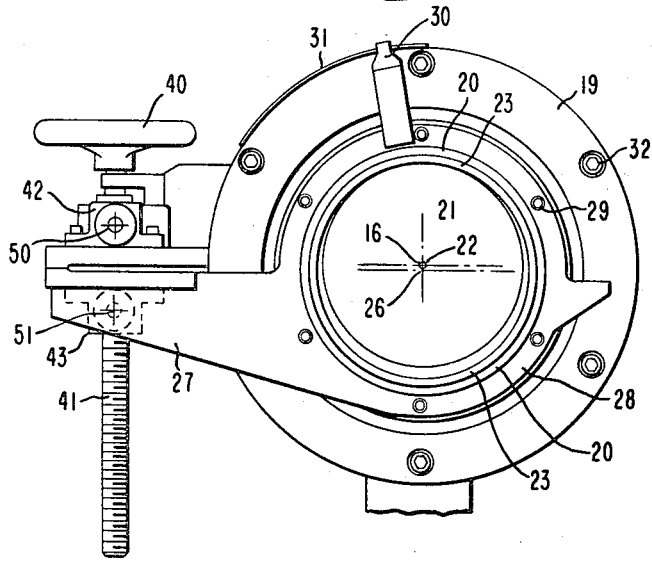
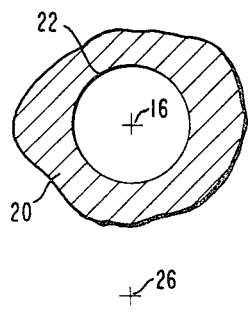
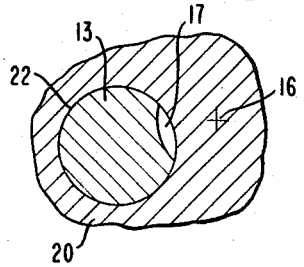
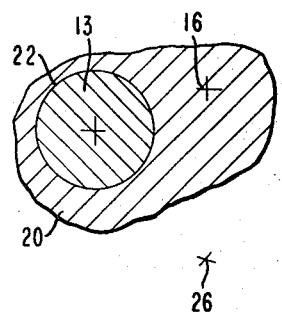
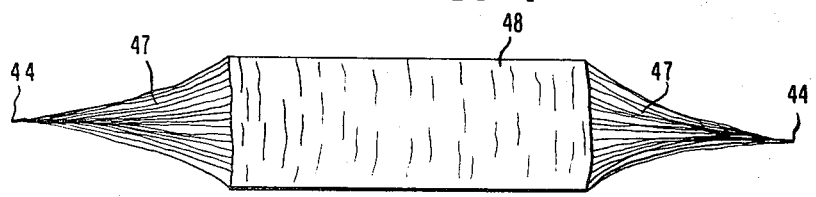
INVENTOR
LUDVIK MAJOCH
BY  *Dan M. Kerr*
ATTORNEY

United States Patent Office 3,417,431
Patented Dec. 24, 1968

3,417,431
ADJUSTABLE EXTRUSION DIE
Ludvik Majoch, Windy Hills, Newark, Del., assignor to E. I. du Pont de Nemours and Company, Wilmington, Del., a corporation of Delaware
Filed Jan. 30, 1967, Ser. No. 612,551
2 Claims. (Cl. 18—12)

ABSTRACT OF THE DISCLOSURE

An extrusion die having an orifice with adjustable cross-sectional area is disclosed. Two abutting die-portions, one fixed, the other rotatable, each contain cylindrical orifice-portions of equal diameters. The axis of rotation of the rotatable die-portion is eccentric to the axis of the orifice-portion in the fixed die-portion, and is equidistant from the axes of both orifice-portions. Rotation of the rotatable die-portion to the position where the axes of the two orifice portions coincide provides maximum opening; rotation to a position where there is no overlapping area between the two orifice-portions closes the orifice.

Background of the invention

This invention relates to dies for the flash-extrusion of polymeric strands and more particularly to an extrusion die having one or more orifices with adjustable cross-sectional area.

In general, when it is necessary to adjust flow through extrusion orifices designed to produce polymeric filaments, strands, or yarns, either pressure and temperature of the flowing polymeric composition are varied upstream of the orifice or an adjustable flow-control valve is introduced in the transfer line between the supply and the orifice. A variety of external orifice-closure devices for on-off control is well known. It is also known to provide variable cross-section in jets with annular openings by providing a cone-shaped center obstruction movable along the extrusion direction. Likewise, variable-width extrusion slits are known in which a fixed straight edge is parallel to and coplanar with an adjustable straight edge. None of these known devices provide flow-control by change in the cross-sectional area of an orifice adapted to the extrusion of polymeric filaments, strands, or yarns.

Summary of the invention

The extrusion-die of the present invention provides adjustable flow control of a polymer solution during its extrusion. Further, it provides for terminating flow through the orifice. Still further, it provides for shunting the entire polymer solution supply through it when flow-stoppage occurs at other orifices being fed by the solution preparation system, thus avoiding gelation of solution in distribution lines under no-flow conditions. Other provisions of the invention will become apparent in the remainder of this specification.

These provisions result from the present invention which is an extrusion die having at least one exit orifice whose cross-sectional area is adjustable during extrusion, said orifice comprising two generally cylindrical orifice portions of equal diameters, said orifice-portions having axes generally perpendicular to flat, parallel and abutting surfaces of their respective die-portions, a first orifice-portion and its die-portion having a fixed position relative to the extrusion-die, the second die-portion being provided with means for its rotation about an axis parallel to, but eccentric to, the axis of said first orifice-portion, the axes of both orifice-portions being equidistant from said eccentric axis of rotation, whereby rotation of said second die-portion moves said second orifice-portion across first orifice-portion to change the cross-sectional area of the orifice from a maximum when the axes of the two orifice-portions are coincident to zero when the two orifice-portions have no mutual overlapping area.

A preferred extrusion-die according to this invention is adapted to the production of fibrillated plexifilamentary strands as described by Blades and White in U.S. Patent No. 3,081,519, the disclosure of which is incorporated herein by reference. Such a die is characterized by two orifices in series with a pressure let-down zone therebetween. A single-liquid-phase polymer solution is fed to the die at elevated pressure and temperature, passes through a pressure let-down orifice into the pressure let-down zone where a homogeneous two-liquid-phase polymer solution develops at the reduced pressure, and thence passes through the flow-control exit-orifice of this invention into a region of sharply reduced pressure (e.g., less than about 100 p.s.i.g. (7 kg./cm.² gage)) whereupon the solvent flashes off to create a plexifilamentary strand of solidified polymer. A suitable process is disclosed in detail by Blades and White in U.S. Patent No. 3,227,784 and with more particularity by Anderson and Romano in U.S. 3,227,794.

Brief description of the drawings

FIGURE 1 is a cross-sectional view in elevation of a preferred extrusion die.

FIGURE 2 is an end view of the preferred die as indicated at 2—2 of FIGURE 1.

FIGURE 3 is a schematic representation in partial cross-section of apparatus attachable to the die of FIGURES 1 and 2 for preparing a preferred product.

FIGURE 4 represents a fully open orifice.

FIGURE 5 represents a partially open orifice.

FIGURE 6 represents the completely closed orifice.

FIGURE 7 is of a section of the preferred densified log of backwindable plexifilamentary strand.

Description of the preferred embodiment

This invention is best understood with reference to the cross-section of FIGURE 1 and the end-view of FIGURE 2, the latter taken as indicated by 2—2 of FIGURE 1. In this preferred extrusion die, the first die-portion 10 is a suitably pressure-sealed disc inserted in die-body 11 and containing first orifice-portion 12. The second die-portion 20 is a generally cylindrical cap fitting over the exit-end of die-body 11, containing second orifice-portion 22, providing a large space 21 within which the extruded polymer-solution flashes to form a solidified plexifilamentary strand, and ordinarily shaped for the attachment of additional apparatus, e.g., on the turned-down shoulder 23.

In the embodiment shown, first die-portion 10 and die-body 11 are separate pieces, and the former is fixedly attached to the latter by, e.g., bolts 55. Although this is preferred, it will be understood that the first die-portion 10 and die-body 11 could be an integral element.

Die-portions 10 and 20 are in metal-to-metal contact in restricted flat facing areas 13 surrounding the two orifice-portions 12 and 22 and defined by circular protrusion 24 an circular groove 14 which together assure the proper mating of die-portions 10 and 20 when die-portion 20 is rotated. Circular bearings 15 and 25 hold second die-portion 20 in place and provide surfaces for its rotation. External means are provided for rotating second die-portion 20 about its axis of rotation 26, said means in the preferred apparatus shown comprising a lever 27 integral with a metal ring 28 by which lever 27 is attached to die-portion 20 with, for example, bolts 29. Preferably an indicating pointer 30 is attached to die-portion 20 for display, via suitable calibrated scale 31, of the extent of rotation. Finally, mounting ring 19 holds second die-portion 20 to die-body 11 via clamping force on bearing ring 25, said mounting ring 19 being fixedly attached by means of bolts 32, as shown. Shims may be inserted between mounting ring 19 and die-body 11 for assuring flat metal-to-metal contact of abutting areas 13. In FIGURE 1, pairs of filled circles at contacting areas of die-parts signify cross-sections of deformable pressure-sealing gaskets, e.g., O-ring. Finally, in order to provide for assembly and retention of bearing ring 15, a demountable retainer ring 33 is attached to die-portion 20 by, for example, bolts 34.

A fixed-axis 16 for the die-assembly passes through the center of orifice-portion 12 and also, in the embodiment shown, through the center of an upstream pressure-let-down orifice 35. The axis of rotation 26 of die-portion 20 is eccentric to fixed-axis 16. At one extreme of rotation of die-portion 20, as shown in FIGURES 1 and 2, the axes of orifice-portions 12 and 22 are coincident to define a fully open condition of the combined orifice. This is shown by the enlarged end-view of the combined orifice in FIGURE 4. When lever 27 is pushed downward to rotate die-portion 20 about axis 26, orifice-portion 22 rotates across orifice-portion 12 so that some of abutting area 13 covers a part of orifice portion 22, as shown in FIGURE 5. The shape of the opening 17 in this partially closed configuration resembles a cat's eye; such an adjustable orifice is therefore named a "cat's-eye orifice." As shown in FIGURE 6, continued rotation by forcing lever 27 downward eventually causes orifice-portion 22 to be completely covered by abutting area 13. Thus, the cat's-eye orifice can serve as a shut-off valve. Its primary utility is, however, that of providing adjustable flow; ordinarily an upstream valve, e.g., a gate-valve, serves for terminating flow.

The equal diameters of orifice-portions 12 and 22 are ordinarily between about 0.10 and 0.25 inch (2.5 and 6.4 mm.). In a particularly preferred cat's-eye orifice, the orifice diameter is about 0.175 inch (4.44 mm.) and the perpendicular separation between axes 16 and 26 is about 0.25 inch (6.35 mm.). Under these conditions, the minimum angle of rotation of die-portion 20 between fully open (FIGURE 4) and fully closed (FIGURE 6) states is about 39 degrees.

Lever 27 can be adjustably moved by any of several means including remotely operated devices. In the embodiment shown in FIGURE 2, for example, a knob 40 on one end of shaft 41 is provided. Shaft 41 passes through a housing 42 attached to die-body 11 such that, when rotated by knob 40, its vertical position relative to die-body 11 is fixed but it is free to swivel about axis 50 in the plane shown. Shaft 41 is threaded over the remainder of its length where it passes through a housing 43 attached to lever 27. Within housing 43 is a swiveled threaded opening (not shown) which moves along shaft 41 as knob 40 is rotated, thus rotating die-portion 20 by displacement of lever 27. It is readily apparent that shaft 41 tilts as lever 27 moves downward and that swiveled attachments of it to housings 42 and 43 are necessary. Axis 51 denotes the axis of rotation of the threaded opening within housing 43. It is not intended that the cat's-eye orifice in the die of this invention be limited to any particular device for rotation of its die-portion 20.

Each of orifice-portions 12 and 22 has a land-length along the direction of extrusion. The ratio of the two land-lengths can take substantially any value, but the preferred cat's-eye orifice has substantially all of its land-length within rotatable die-portion 20, as indicated in FIGURE 1. Ordinarily the combined land-length is within about 0.5 to 2 times the orifice-diameter, but this dimension is likewise non-limiting.

The remainder of a preferred embodiment of the extrusion-die of this invention is described with reference to FIGURE 1 in which hot pressurized polymer-solution is admitted to the die through cylindrical channel 37. Thereafter, the solution passes through let-down orifice 35 into a cylindrical chamber 36 where pressure on the solution is reduced to a level at which a two-liquid-phase solution develops but not below autogeneous pressure for the solution. Thereafter, the solution passes through the cat's-eye orifices 12 and 22 and flashes off the solvent to form a fibrillated plexifilamentary strand. The die housing is bored with passages 18 for the introduction and removal of heating fluids via fittings 45. Suitable supports 38 and 39 are also provided for mounting the assembly in position. By way of further illustrating the scale of the preferred embodiment, let-down chamber 36 is of the order of 2 inches (5 cm.) in diameter and 18 inches (45 cm.) long and the large space 21 is about 8 inches (20 cm.) in diameter. This invention is not intended, however, to be restricted to particular dimensions of its parts.

The preferred extrusion-die, utilizing the cat's-eye orifice of this invention, is particularly useful for the production of a novel continuous log 48 (FIGURES 3 and 7) of condensed plexifilamentary strand 47. As shown in FIGURE 3, a perforated cylinder 46 is fastened to die-portion 20 at attachment shoulders 23. Preferably a slightly tapered, generally cylindrical extension 52 of cylinder 46 is used for constricting log 48 slightly whereby to increase its density. Ordinarily extension 52 is modified at its terminal end to form a supporting delivery chute 53, and a retractable barrier 54 is provided. Initially barrier 54 is placed across the exit-opening of extension 52 until collected plexifilamentary strand 47 fills extension 52 with the beginning of a continuous log 48. Thereafter, barrier 54 is raised out of the path of advancing log 48, which continues to form spontaneously and to be delivered along chute 53. As log 48 fills perforated cylinder 46, so many perforations 49 become covered that pressure increases within cylinder 46 and causes log 48 to move faster until enough perforations 49 are opened to decrease pressure. Thus, log 48 is continuously produced at a self-balancing rate. Logs 48 with density between about 1 and 15 lb./ft.$^3$ (0.016 and 0.24 gm./cc.) are readily formed. They can be of any length. From each surface formed by breaking a preferred log 48, a single end 44 (FIGURE 7) of plexifilamentary strand 47 can readily and continuously be drawn.

In a particularly preferred commercial use of the flow-control die of this invention, it is coupled with apparatus for producing nonwoven sheets comprising layers of randomly oriented overlapping continuous fibrillated plexifilamentary strands as disclosed by Steuber in U.S. Patent No. 3,169,899. A single polymer-solution preparation system supplies both the flow-control die of this invention and a plurality of dies adapted to production of nonwoven sheet. Such an arrangement is principally for the production of nonwoven sheet, the backwindable log 48 being a second product. Thus, the cat's-eye orifice can be opened only enough to simultaneously produce the desired quantity of backwindable log 48, or it may be fully opened.

As is known in processes adapted to the extrusion of polymeric filaments, yarns, or strands, temporary stoppage of polymer-flow is sometimes necessary for cleaning or adjustments. If polymer-solutions remain stagnant in distribution lines, however, they frequently gel so that restarting flow involves extensive disassembly, cleaning, and reassembly of the apparatus. This problem is frequently eliminated by providing a dump-valve through which solution is temporarily diverted to waste without disruption of solution-flow. The cat's-eye orifice of this invention has the particular advantage that, when fully opened, it is able to handle the total output of the solution-preparation thus serving as a dump-valve while simultaneously producing a valuable product in the form of a log 48 of backwindable plexifilamentary strand 47. Losses to waste during temporary shut-down of nonwoven sheet production are therefore substantially eliminated.

While the flow-control die of this invention is particularly useful for the production of logs 48 of backwindable plexifilamentary strand 47, as described, it is not limited to that process. It can regulate the extrusion rate of polymer solutions, polymer dispersions, or molten polymer. Besides plexifilamentary strands, other products can be so produced including, for example, foamed strands, sponges, and solid filaments. Nor is the die of this invention restricted to one with a single cat's-eye orifice. By providing in each die-portion a circle of identically spaced orifice-portions, the eccentric axis of the rotatable die-portion coinciding with the center of its circle of orifice-portions, a die with a plurality of equivalent cat's-eye orifices results.

Lever 27 of FIGURE 2 is a simple and direct means for rotating die-portion 20, but others are within the scope of this invention including, for example, a more complicated system of toothed gears. Many alternatives and variations within the scope of this invention will be apparent to those skilled in the art when considering adapting the cat's-eye orifice to other extrusion equipment for preparing polymeric filaments, strands, or yarns.

I claim:

1. An extrusion-die having at least one exit-orifice whose cross-sectional area is adjustable during extrusion, said orifice comprising two generally cylindrical orifice-portions (12, 22) of equal diameters, said orifice-portions having axes generally perpendicular to flat, parallel, and abutting surfaces of their respective die portions (10, 20), a first orifice portion (12) and its die-portion (10) having a fixed position, relative to said extrusion die, the second die-portion (20) being provided with means for its rotation about an axis (26) parallel to, but eccentric to, the axis (16) of said first orifice-portion (12), the axes of both orifice-portions (12, 22) being equidistant from said eccentric axis of rotation (26), whereby rotation of said second die-portion (20) moves said second orifice-portion (22) across said first orifice-portion (12) to change the cross sectional area of the orifice from a maximum when the axes of the two orifice-portions (12, 22) are coincident to zero when the two orifice-portions (12, 22) have no mutual overlapping area.

2. A die-assembly for flash extrusion of polymeric strands comprising the extrusion-die of claim 1 in combination with a supply line (37) for delivering a polymer solution at elevated temperature and pressure to said exit-orifice, said supply line containing an orifice (35) upstream of said exit-orifice, whereby a pressure let-down zone (36) is provided between said orifices.

References Cited
UNITED STATES PATENTS

| | | | |
|---|---|---|---|
| 1,959,638 | 5/1934 | Jacobson | 18—12 |
| 2,487,910 | 11/1949 | Waddell et al. | |
| 2,967,613 | 1/1961 | Ellis et al. | 18—12 XR |
| 2,975,478 | 3/1961 | Finster | 18—12 XR |
| 3,215,094 | 11/1965 | Oldershaw et al. | |

WILLIAM J. STEPHENSON, *Primary Examiner.*

U.S. Cl. X.R.

18—8, 14